United States Patent
Karashima et al.

(10) Patent No.: US 7,435,170 B2
(45) Date of Patent: Oct. 14, 2008

(54) GAME PROCESSING METHOD, GAME APPARATUS, GAME PROGRAM, AND STORAGE MEDIA FOR SAME

(75) Inventors: Kazutaka Karashima, Tokyo (JP); Yoshiji Kosaka, Tokyo (JP)

(73) Assignee: Sega Corporation (JP)

( * ) Notice: Subject to any disclaimer, the term of this patent is extended or adjusted under 35 U.S.C. 154(b) by 579 days.

(21) Appl. No.: 10/945,079

(22) Filed: Sep. 21, 2004

(65) Prior Publication Data
US 2005/0107145 A1    May 19, 2005

(30) Foreign Application Priority Data
Sep. 25, 2003    (JP)    ............... 2003-333801

(51) Int. Cl.
*A63F 13/00* (2006.01)
(52) U.S. Cl. .......................................................... 463/8
(58) Field of Classification Search ...................... 463/1, 463/7, 8
See application file for complete search history.

(56) References Cited

U.S. PATENT DOCUMENTS
5,390,937 A * 2/1995 Sakaguchi et al. ............. 463/7

FOREIGN PATENT DOCUMENTS
JP         7-328228        12/1995

OTHER PUBLICATIONS

The Magazine "DENGEKI-OH", vol. 10, No. 14, p. 37, Nov. 2002.
The Magazine, "DENGEKI PLAYSTATION", vol. 8, No. 20, p. 191, Sep. 13, 2002.
The Magazine, "MEGATUDO 2096", p. 75, Nov. 20, 1996.
The Magazine, PLAYSTATION WIN AT ANY COST SPECIAL, SAMURAI SPIRITS FORMAL GUIDE BOOK, p. 76, Oct. 4, 1998.
The Magazine "GAME MACHINE NO. 597", p. 19, Oct. 15, 1999.
The Magazine "DENGEKI PLAYSTATION vol. 168", p. 97, Feb. 9, 2001.
The Magazine "GAMEST", vol. 13, No. 23, p. 10-11, Apr. 30, 1998.
The Magazine, "THE AMUSEMENT INDUSTRY vol. 27, No. 12", p. 154, Nov. 26, 1998.
The Magazine, "LEGEND OF MANA ULTIMATE", p. 112, Sep. 30, 1999.
The Magazine, "ALL ABOUT CAPCON FIGHTING PLAY GAME 1987-2000", p. 27, Sep. 15, 2000.

* cited by examiner

*Primary Examiner*—Scott E Jones
(74) *Attorney, Agent, or Firm*—Dickstein Shapiro LLP

(57) ABSTRACT

Game processing apparatus executes a game in which a player character in a virtual space defeats an enemy through operation of a controller by the player. Through operation of an attack button of a controller, branch technique of a ninja is employed to display branch of the player character as afterimages, with attack capabilities imparted to branch. Consequently the attack potential is enhanced, the action of the action game can be made more diverse, the interest of the player in the game is increased, and the game is made more stimulating.

14 Claims, 15 Drawing Sheets

FIG. 9
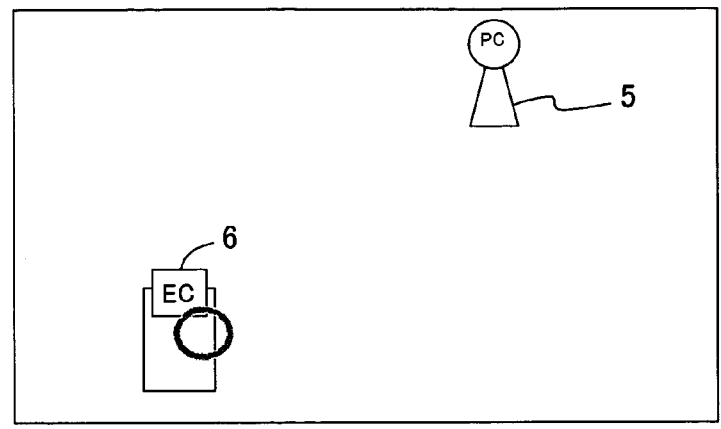
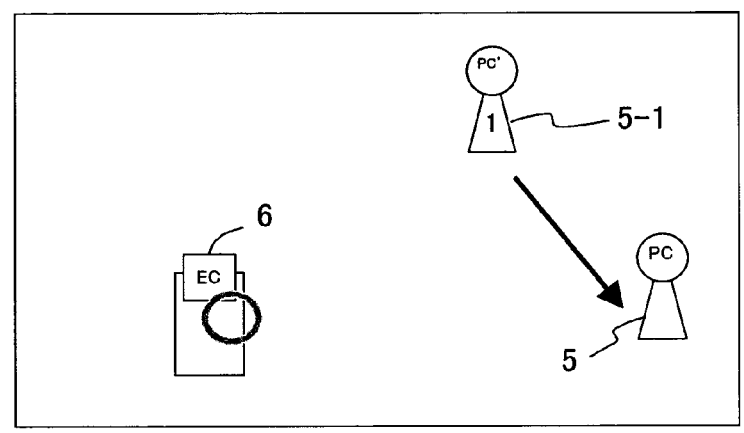
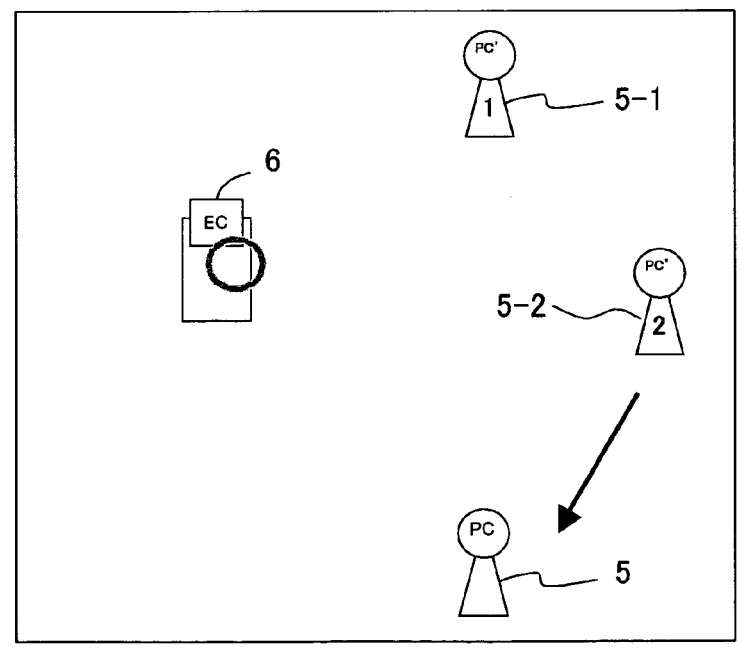

FIG. 10
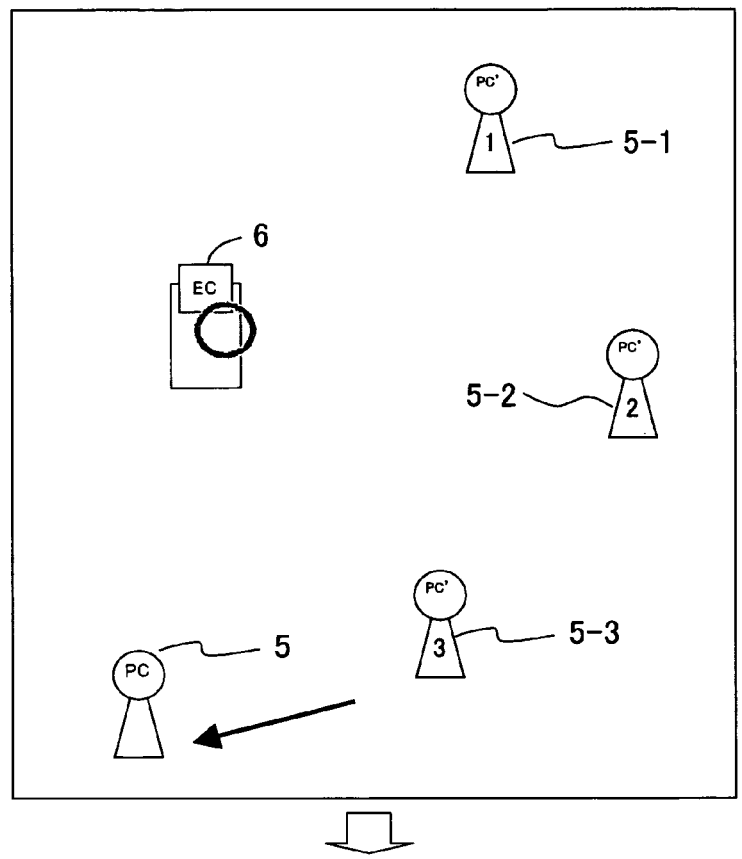
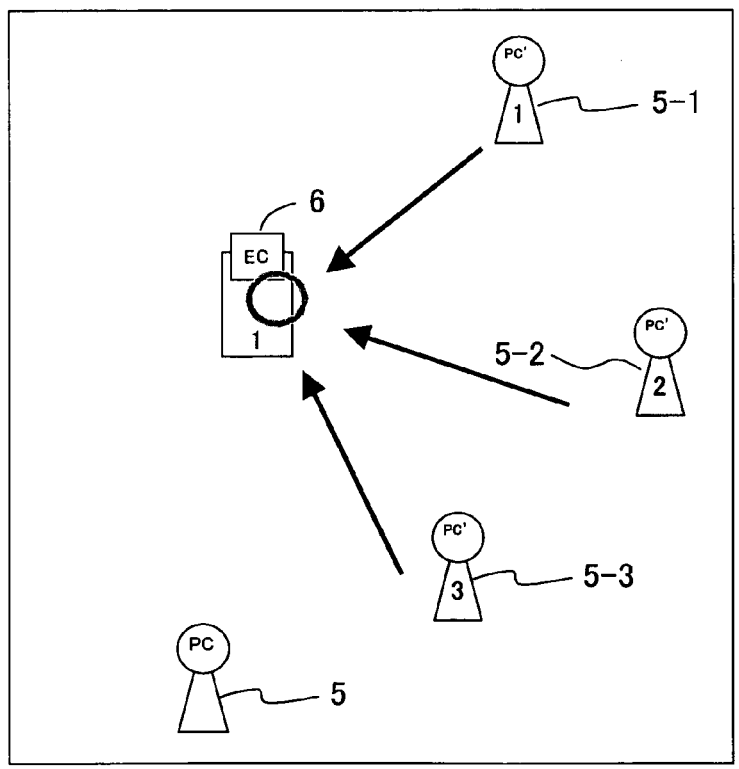

GAME PROCESSING METHOD, GAME APPARATUS, GAME PROGRAM, AND STORAGE MEDIA FOR SAME

CROSS-REFERENCE TO RELATED APPLICATIONS

This application is based upon and claims the benefit of priority from the prior Japanese Patent Application No. 2003-333801, filed on Sep. 25, 2003, the entire contents of which is incorporated herein by reference.

BACKGROUND OF THE INVENTION

1. Field of the Invention

This invention relates to a game processing method, game apparatus, game program, and storage media for playing an action game or other game with a computer by a player, and in particular relates to a game processing method, game apparatus, game program, and storage media for enhancing the game-playing performance of the action game.

2. Description of the Related Art

Computer games which employ the data processing and image processing functions of computers are in wide use. Such computer games include fighting games, war games, exploration games, and other action games. In such action games, in addition to a sense of virtual realism, action performances are also required in order to further elicit player interest.

For example, in some action games an enemy is set to oppose the player, and the player defeats the enemy appearing on the screen. A game console is operated to move the player in all directions on the screen, approaching or moving away from the enemy when he appears, avoiding the enemies attacks, or attacking the enemy.

In such an action game, various performance effects are provided in order to heighten the interest of the player. For example, the player character on the screen may be caused to split into copies or branch, or afterimages may be displayed accompanying movement of the player character (see for example Japanese Patent Laid-open No. 7-328228).

The effect of such splitting into branch characters and afterimages is to increase the sense of visual realism and provide the game with a performance aspect. Also, in such action games, normally game play is evaluated in simplistic terms as the number of points scored when enemy A is defeated, the number of points scored when enemy B is defeated, and so on. That is, the object of evaluation is made simple, and upon accumulation of such evaluations, after the game ends a performance is given according to the evaluation.

However, there is a problem that branch character-splitting and afterimages of conventional game screens are merely performance effects for display, and are not game-related performance effects which enhance the game action with respect to the enemy, and thus not contributing to the action attributes of the game itself.

SUMMARY OF THE INVENTION

Hence an object of this invention is to provide a game processing method, game apparatus, game program, and storage media for amplifying the attributes of attacks on an enemy character.

Another object of this invention is to provide a game processing method, game apparatus, game program, and storage media for performing a game in which the player can employ more sophisticated strategy when confronting an enemy, through the use of branch characters of the player character.

Still another object of this invention is to provide a game processing method, game apparatus, game program, and storage media to improve the performance of action in which an enemy character is attacked through the use of branch characters of the player character.

In order to achieve these objects, the game processing method or program, where a player character defeats an enemy in a virtual space through player operation of a controller, has branch attack preparation step or program data of arranging branch character in relation to the position of the player character in the above virtual space and displaying the player character and branch character according to branch-generation operation of the above controller, and branch attack step or program data of processing attack to the enemy such that at least branch character attacks the enemy according to branch attack operation of the above controller.

In this invention, it is preferable that the game processing method or program further have a step of locking on the above enemy which is to be attacked, according to a lock-on operation using the above controller.

In this invention, it is preferable that the branch attack preparation step has a step of displaying the above player character and branch character, according to whether the attack button of the above controller is pressed for a fixed length of time.

In this invention, it is preferable that the game processing method or program further have a step of canceling branch attack preparation step when pressing of the above attack button for a fixed length of time is not detected.

In this invention, it is preferable that the game processing method or program further have a step of canceling branch attack preparation step in response to cancellation of the above lock-on operation.

In this invention, it is preferable that the game processing method or program further have a step of accumulating points corresponding to damage imparted to the above enemy through operations by the above player, and a step of permitting branch attack when the accumulated number of the above points is equal to or greater than a certain number.

In this invention, it is preferable that the branch attack preparation step has a branch attack preparation step of positioning branch character in a position according to movement operations by the player for the above player character within the above virtual space, in response to branch generation operation using the above controller, and of displaying the above player character and the above doppelganger character.

In this invention, it is preferable that the branch attack preparation step has a branch attack preparation step of positioning branch character in a position on the periphery of the above player character in the above virtual space, in response to branch generation operation using the above controller, and of displaying the above player character and branch character.

In this invention, it is preferable that the game processing method or program further have a step of canceling branch preparation step when, after branch attack preparation step, the above player character receives damage from the above enemy character.

In this invention, it is preferable that the branch attack preparation step has a branch attack preparation step of positioning a plurality of branch characters in relation to the position of the above player character in the above virtual space, in response to branch generation operation using the above controller, and of displaying the above player character and the above plurality of branch characters.

In this invention, it is preferable that the game processing method or program further have a step of accumulating points corresponding to damage imparted to the above enemy through operations by the above player and a step of permitting the above branch attack when the accumulated number of the above points is equal to or greater than a certain number, and that the above branch attack preparation step has a branch attack preparation step of positioning a plurality of branch characters, according to the above number of points accumulated, in relation to the position of the above player character in the above virtual space according to branch generation operation using the above controller, and of displaying the above player character and the above plurality of branch characters.

Through this invention, a controller can be used in branch generation and attack operations, employing the skills of Ninja branch, displaying branch as reproductions of the player character, and providing branch characters with attack capabilities, so that the potential for attack is enhanced, the action in an action game can be rendered more diverse, the interest of the player in the game is intensified, and the game is made more stimulating.

Further, such optional attack functions are provided to a player only when prescribed conditions enabling branch attacks have been satisfied, so that the interest of the player in the game can be further increased. And even in the state of branch attack preparation, conditions for cancellation of this state are provided, so that the player can be provided with a function to easily cancel preparation, even while being impelled to quickly perform operations.

BRIEF DESCRIPTION OF THE DRAWINGS

FIG. 9 explains branch attack preparations for FIG. 7 and FIG. 8;

FIG. 10 explains branch attack of FIG. 7 and FIG. 8;

DESCRIPTION OF THE PREFERRED EMBODIMENTS

Figure 1:
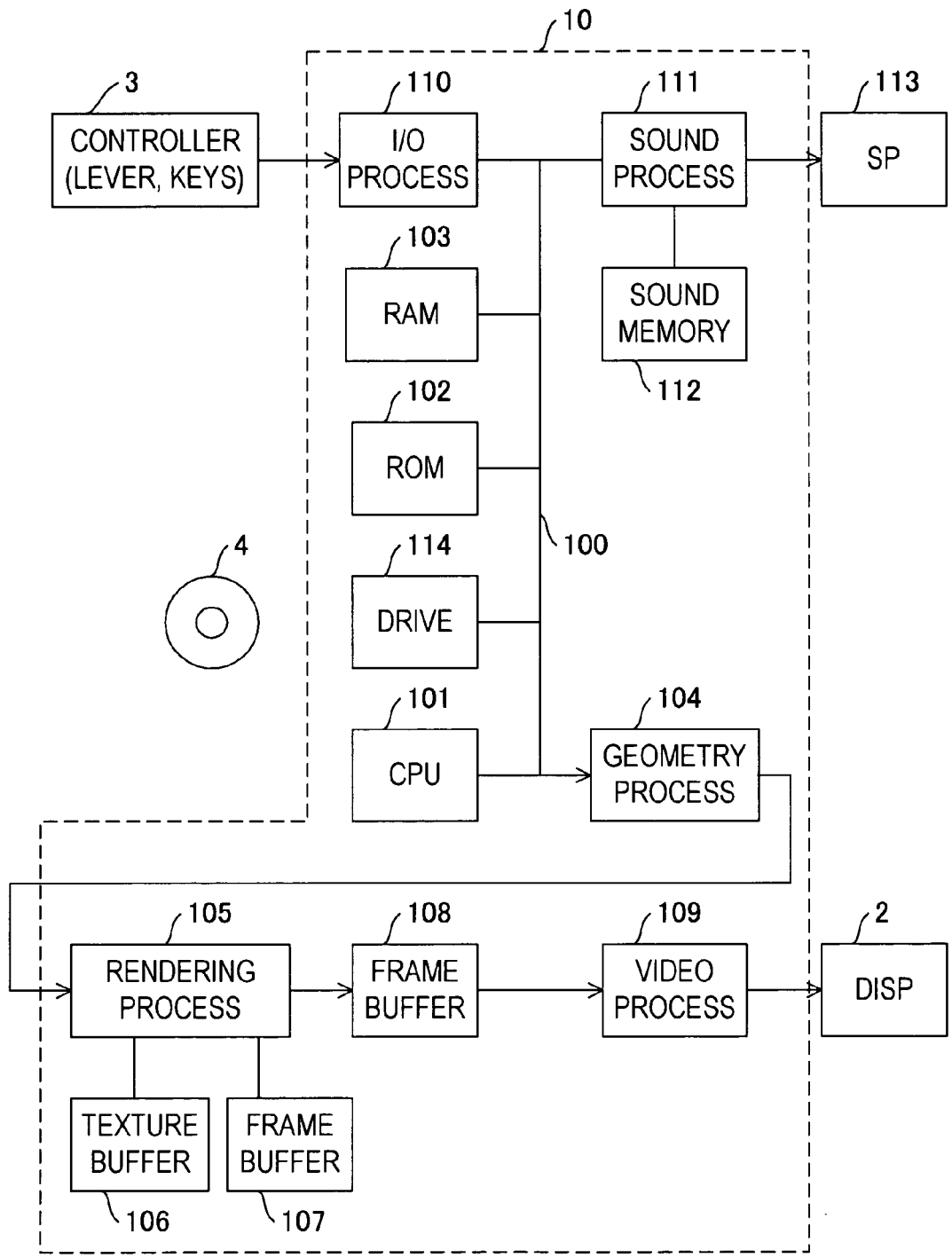
FIG. 1 is a block diagram of a computer game apparatus of one embodiment of the invention.

Below, embodiments of the invention are explained in the order of a computer game apparatus, branch attack method, branch attack processing method of a first embodiment, branch attack processing method of a second embodiment, and other embodiments, referring to the drawings.

Computer Game Apparatus

Figure 2:
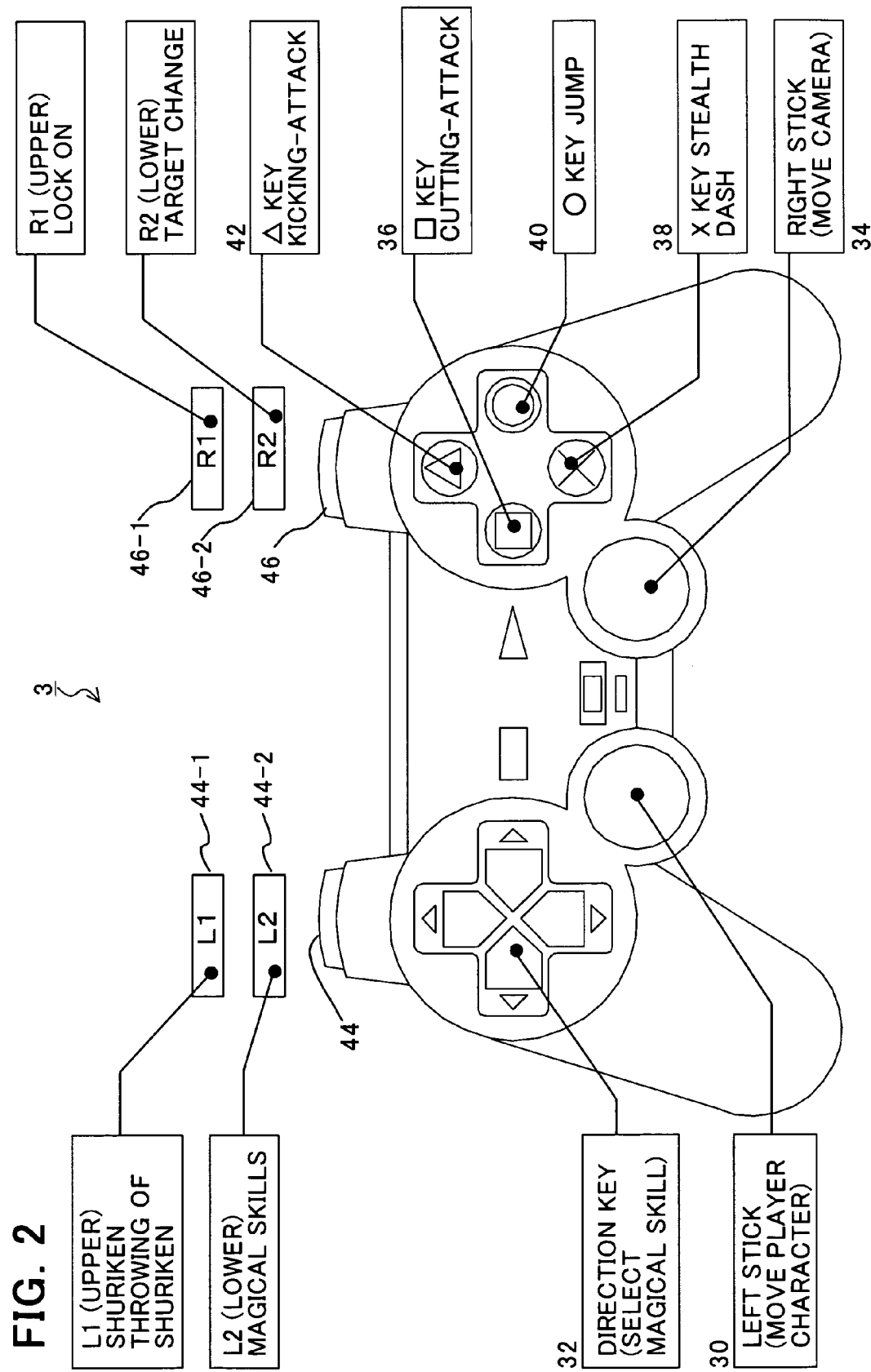
FIG. 2 shows the configuration of the controller of FIG. 1.
Figure 3:
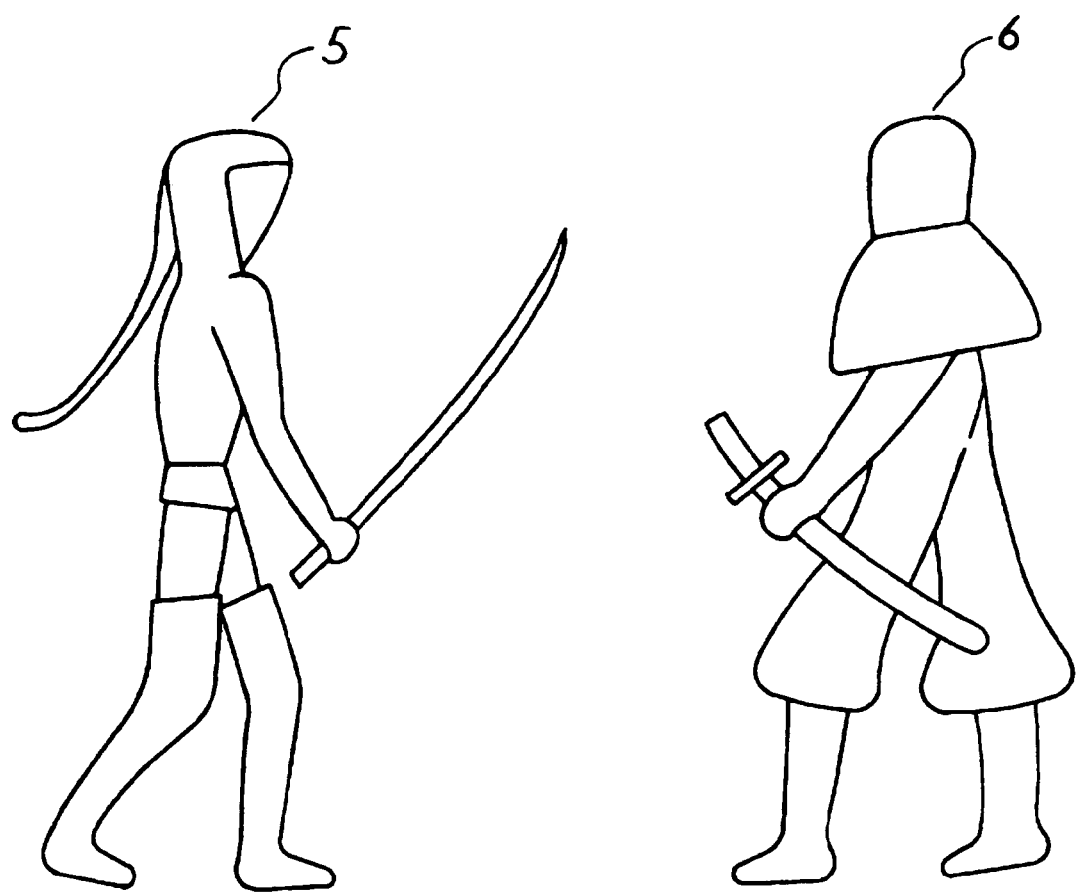
FIG. 3 explains the game program of FIG. 1.

FIG. 1 is a block diagram of a computer game apparatus of one embodiment of the invention, FIG. 2 shows the configuration of the controller of FIG. 1, and FIG. 3 explains the game program of FIG. 1.

As shown in FIG. 1, the main unit 10 of the game apparatus is connected to a controller 3 having levers and buttons, as well as to a speaker 113 and a display monitor 2. The player operates the controller 3 and, in response to this operation, the game apparatus 10 executes the game program, displays screens on the display monitor 2 according to the operation, and emits sounds (sound effects) from the speaker 113.

The controller 3 is explained using FIG. 2 below. The game program is stored on a DVD or other disk media 4, and is provided to the player. The game apparatus 10 has a disk drive 114 which reads the game program from the disk media 4; an I/O processing portion 110 which performs input/output of operation instructions of the controller 3; a CPU 101 which executes the game program; ROM 102 which stores the OS and other programs and parameters; and RAM 103 which is used by the CPU 101 to execute the game program.

The main unit 10 of the game apparatus further has sound memory 112 which stores, in the form of data, various sounds to be generated, and a sound processing portion 111 which selects sound data in the sound memory 112 and generates desired sound signals-according to instructions from the CPU 101. The sound signals are output to the speaker 113.

The main unit 10 of the game apparatus further has image processing portions 104 to 108 to generate three-dimensional images. These are a geometry processing portion 104 which converts three-dimensional coordinates into world coordinates, a texture buffer 106 which stores texture data, a Z buffer 107 which stores data in the Z or depth direction to perform shading processing and similar, and a rendering processing portion 105 which uses both the buffers 106 and 107 to draw in a frame buffer 108. The drawing data in the frame buffer 108 is converted into video signals appropriate for the monitor 2 by the video processing portion 109, which are output to the monitor 2.

As shown in FIG. 2, the controller 3 has a group of game operation keys; on the left side are positioned a left-hand joystick 30 to move the player character, a direction key 32 to select a magical skill (a scroll, flames, thunder, or similar), and positioned on the left-side face 44, an upper key 44-1 to command the throwing of a shuriken, and a lower key 44-2 to use magical skills (to consume a scroll); these keys are operated with the fingers of the left hand.

On the right side, operated with the fingers of the right hand, are positioned the keys 34 to 42, with the player functions indicated. These function keys are defined by the game. This is explained for the ninja ("Kunoichi") action game shown in FIG. 3. As shown in FIG. 3, in this ninja action game a ninja 5 using a sword and shuriken as weapons is a player character, and in this action game the aim is to avoid the attacks of an enemy character 6 which appears onscreen, while using weapons to defeat the enemy character 6.

Ninja functions are provided to the ninja player character 5, and the player can use a cutting-attack key 36 instructing a cutting attack with a sword, a "stealth dash" key 38 instructing high-speed ninja-like movement, a jump key 40 instructing jumping, and a kicking-attack key 42 instructing a ninja-kicking attack. There is also a right joystick 34 to move the camera position (position of the point of view) on the screen.

Also, on the right-hand face 46 are a lock-on key 46-1 to lock on the enemy, and a target-switching key 46-2 to switch the lock-on target.

The player uses the movement keys of the controller 3 to move the ninja player character 5, and uses the function keys to perform actions specific to a ninja, such as kicking, swordplay, shuriken attacks, "stealth dashes", jumping, and similar.

Method of Attack by Branch

Figure 4:
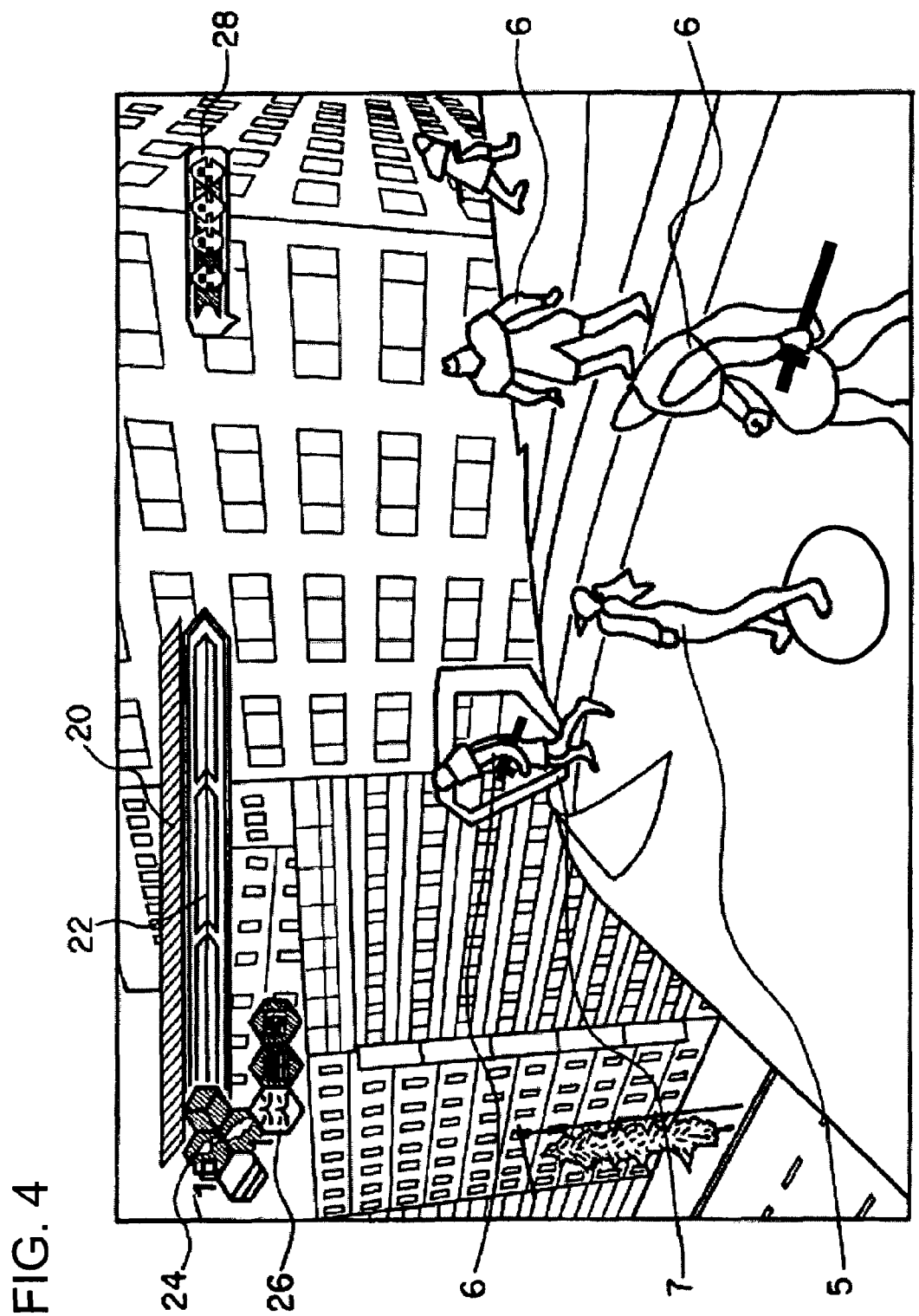
FIG. 4 explains a screen example of the game program of FIG. 1.
Figure 5:
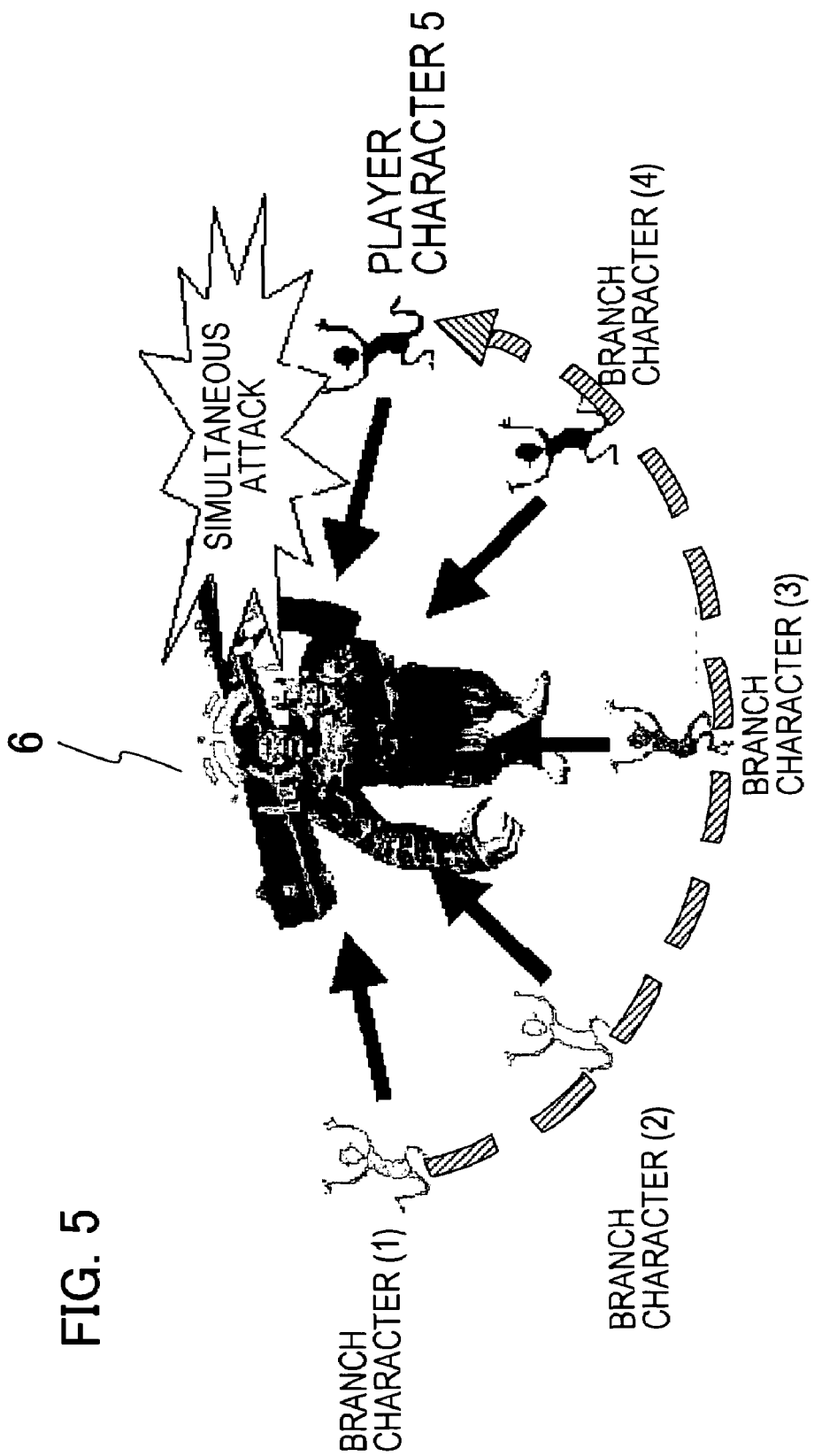
FIG. 5 explains branch attack of FIG. 4.
Figure 6:
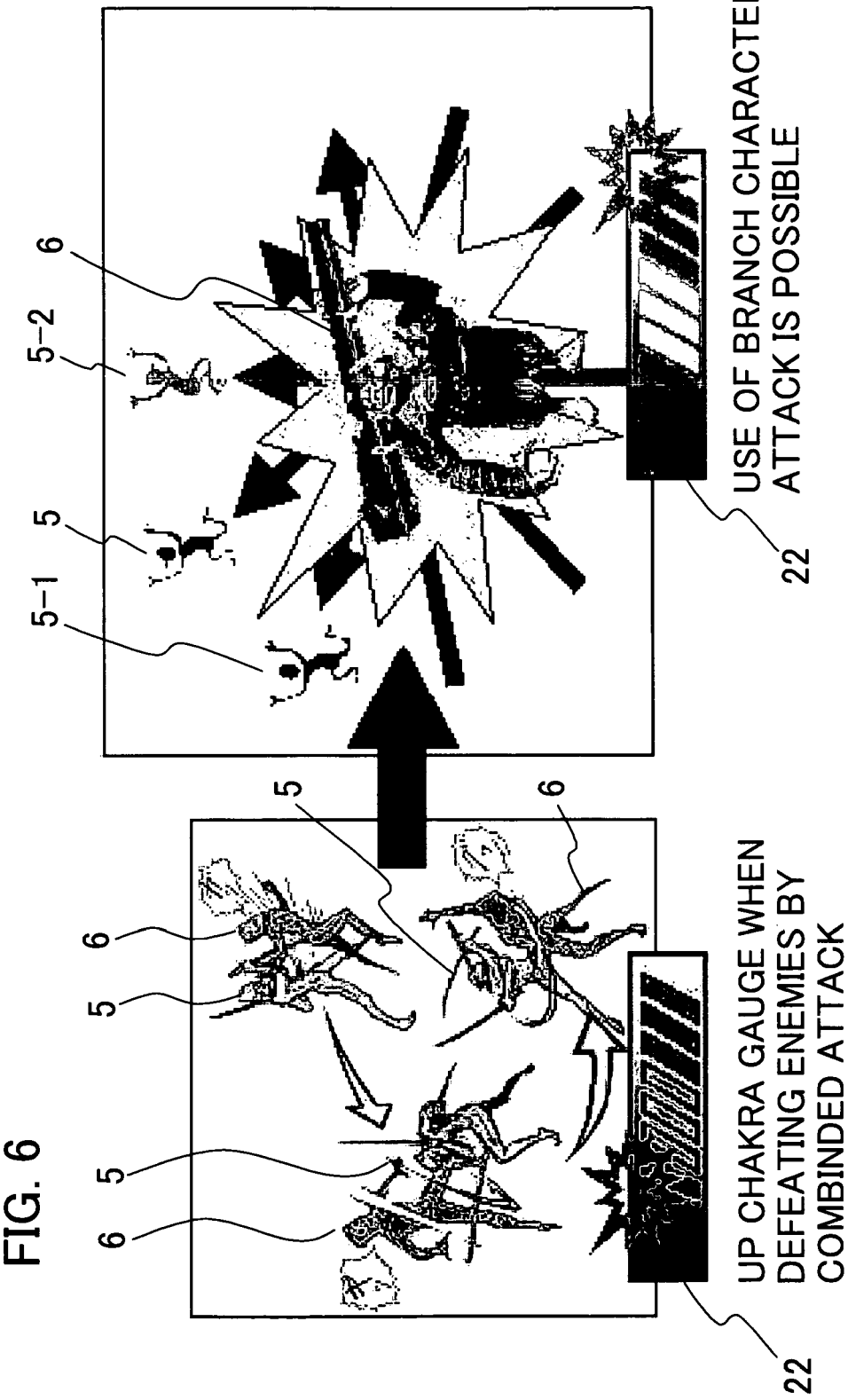
FIG. 6 explains another branch attack of FIG. 4.

Next, a method of attack by branch ('bunshin') is explained, using FIG. 4 through FIG. 6. FIG. 4 explains a screen example of a ninja game, FIG. 5 explains the attack by branch, and FIG. 6 explains conditions enabling branch attacks.

FIG. 4 illustrates circumstances in which a player character (here, a "Kunoichi" ninja) 5 fights with a plurality of enemy characters 6. In the upper-left corner of the screen are displayed a physical strength gauge for the player character (which is lowered by attacks by an enemy) 20, a chakura gauge (an energy gauge) 22 which imparts and increases damage to the enemy, the number of unused shuriken 24, and a display 26 of the magical powers (for example, flames, thunder, wind, or similar) which can be used. In the upper-right of the screen is displayed the number of enemies currently onstage 28.

First, attacks by branch are explained using FIG. 5. An enemy character 6 which is a specific target for attack is locked-on by depressing the lock-on key 46-1 (specifying the character as the target for attack). At this time, in the example of FIG. 4, a lock-on marker 7 is displayed encircling the locked-on enemy character 6, and this is recognized by the player.

The player uses the controller 3 to issue branch attack instructions. That is, in the first embodiment, the cutting-attack key (button) 36 which is an attack button is pressed, and moreover the stealth dash function is used by employing the stealth dash key 38, to perform an operation to generate a branch; and as shown in FIG. 5, the stealth dash function is used to move the player character 5 itself to surround the enemy. Branch characters (1), (2), (3), and (4) are generated according to this movement of the player character, and when the cutting-attack key 36 which is an action button is released (issuing a branch attack instruction), the player character 5 itself and branch characters (1), (2), (3), (4) simultaneously attack the locked-on enemy character 6 (for example, by cutting or thrusting with a sword).

Further, in a second embodiment, when the cutting-attack key (button) 36 which is an attack button is pressed (when branch generation operation is performed), branch characters (1), (2), (3), (4) are generated on the periphery of the player character 5 itself, in contrast with FIG. 5; and when the cutting-attack key 36 which is the attack button is released (when branch attack operation is performed), only branches (1), (2), (3), (4) of the player character 5 execute a simultaneous attack (for example, cutting or thrusting with swords) on the locked-on enemy character 6.

Here, branch characters do not receive attacks from an enemy character, that is, they are characters for which hit judgments are not made, but imitate the shape of the player character. In order to distinguish branch characters from the player character, it is appropriate that effects such as particular colors, transparency, afterimages, smoke, flames, or similar also be imparted.

In order that such an optional attack function increases the player's interest in the game, it is preferable that the capability for branch attacks is given to the player when prescribed conditions to enable branch attacks are satisfied. As shown in FIG. 6, when an enemy character 6 is defeated (cut), the reading of the chakra gauge 22 in FIG. 4 above increases. The chakra gauge 22 is a pointer indicating the attack potential of the player character 5; when the chakra gauge reaches or exceeds a fixed value, branch attack option can be used.

In particular, as shown in FIG. 6, by accumulating gauge points in the chakra gauge in concert with combined attacks (called "combos") using a sword, the mounting of branch attacks becomes possible, so that the player can be compelled to concentrate on the game and can be stimulated.

Thus by utilizing branch techniques of a ninja, and by displaying branch characters using afterimages and providing branch characters with attack capabilities, the attack potential can be enhanced, the action of an action game can be made more diverse, the player interest in the game can be increased, and the game can be made more stimulating. A branch character disappears a fixed amount of time after an attack.

Branch Attack Processing Method of the First Embodiment

Figure 7:
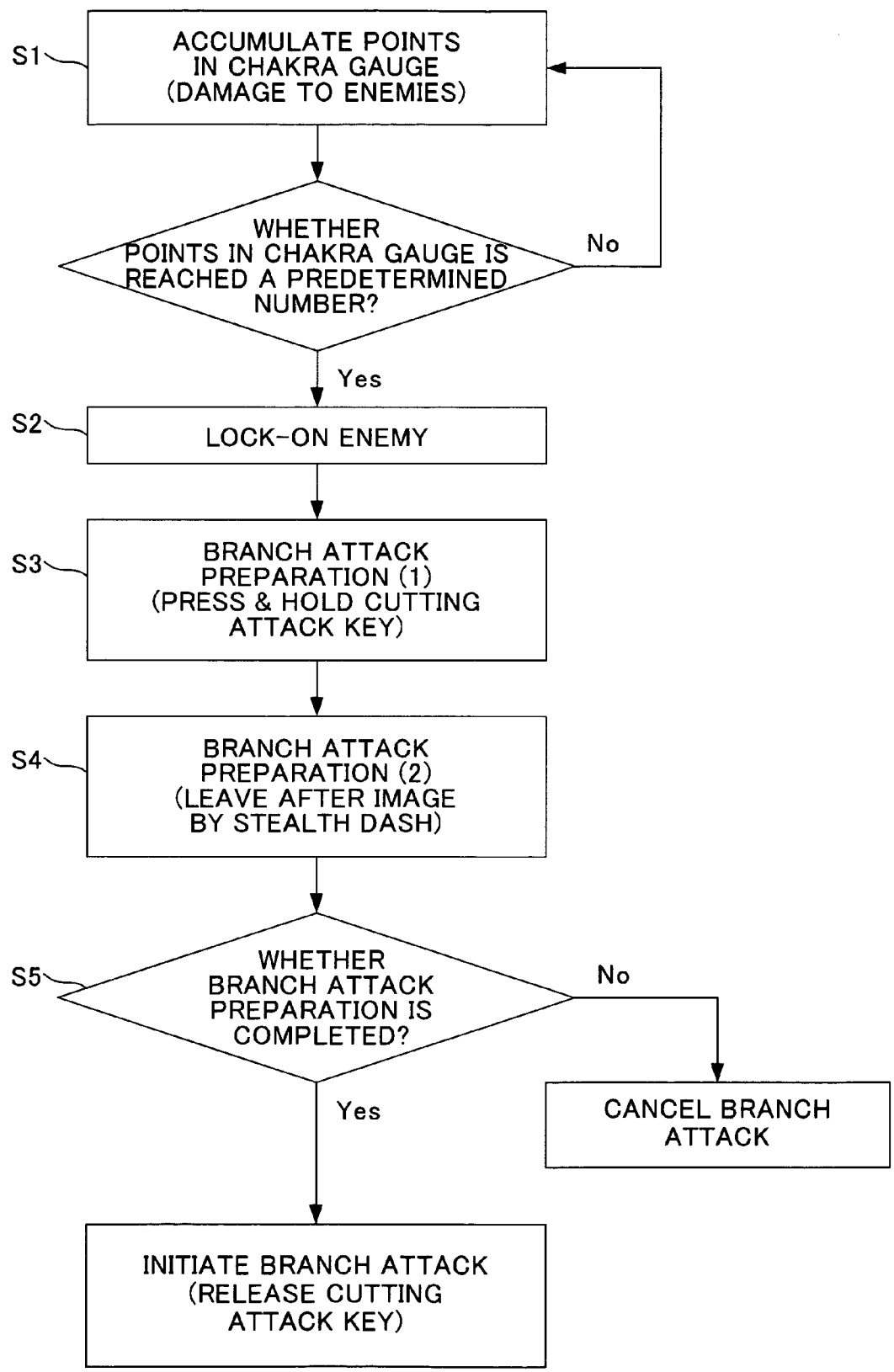
FIG. 7 explains the procedures of branch attack processing of one embodiment of the invention.
Figure 8:
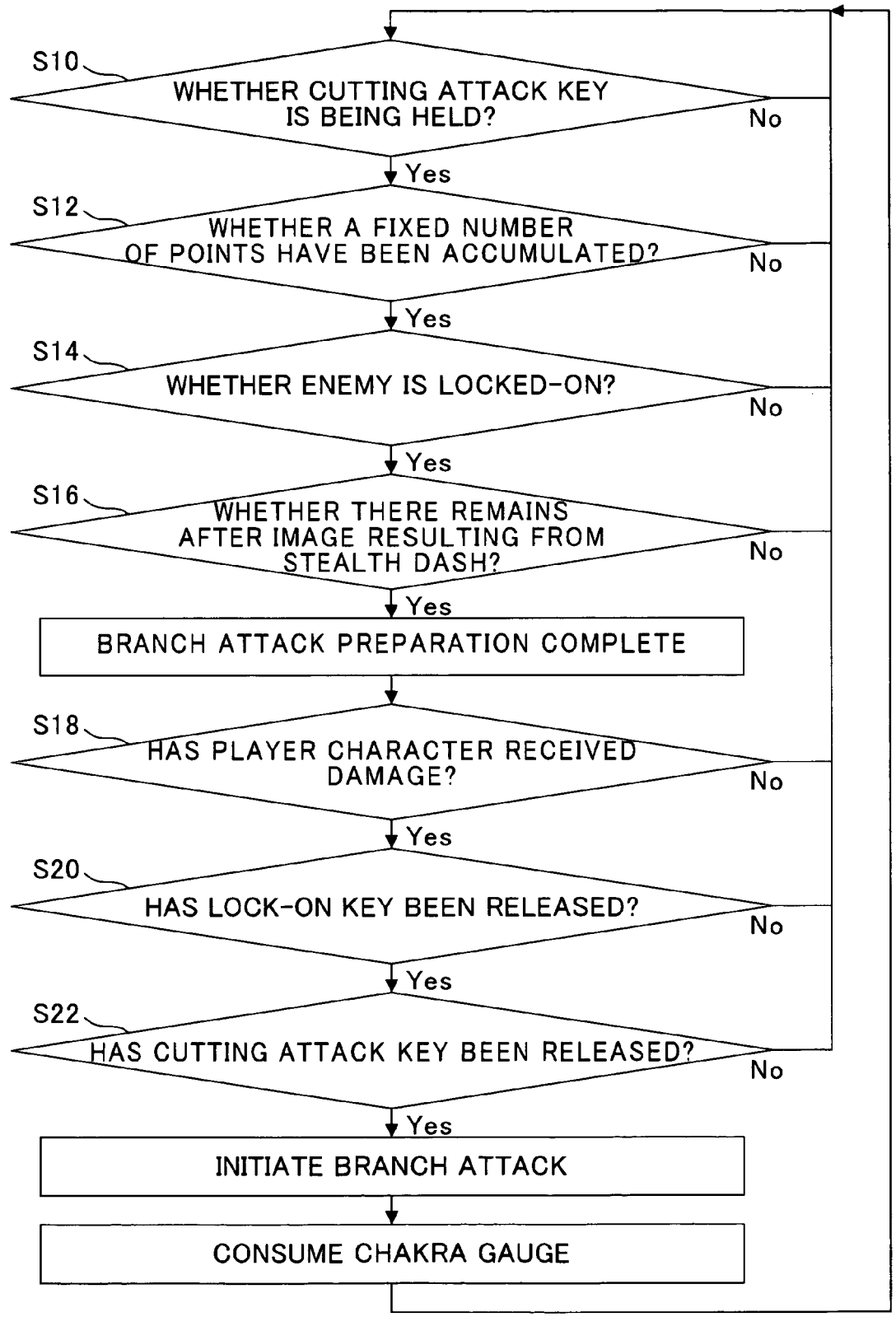
FIG. 8 is a flow diagram of processing of branch attack of FIG. 7.

FIG. 7 explains the procedures of branch attack processing of one embodiment of the invention. FIG. 8 is a flow diagram of processing of branch attack of FIG. 7, and FIG. 9 and FIG. 10 explain branch attack preparations in the first embodiment of the invention.

The procedure for branch attacks is explained using FIG. 7.

(S1) When damage is imparted to an enemy through an attack by the player character, points are accumulated in the chakra gauge 22.

(S2) When a fixed number of points have accumulated in the chakra gauge 22, a branch attack is possible. To perform a branch attack, locking-on of the enemy to be attacked is performed. That is, as shown in the screen at the top of FIG. 9, the player character 5 is made to face to the enemy character 6 to be attacked, and the lock-on key 46-1 is pressed. As a result a lock-on marker 7 is displayed on the periphery of the enemy character 6 for attack, as shown in FIG. 4.

(S3) Next, the cutting-attack key (button) 36 is pressed and held, to enter branch attack preparations (1).

(S4) Then, in order to leave afterimages which are to become branches, the stealth dash key 38 is pressed, and as shown in FIG. 5, in the middle and bottom screens of FIG. 9 and in the upper screen in FIG. 10, the player character 5 makes a dash movement, and afterimages are displayed on the movement path. During this stealth dash also the cutting-attack key 36 must be held down, and while the cutting-attack key 36 is being pressed, a fixed number of afterimages (which is increased or decreased according to the points accumulated in the chakra gauge 22) are displayed as branches 5-1 to 5-3.

(S5) A decision is made as to whether at least one afterimage remains, that is, whether branch attack preparations are completed. If, prior to completion of preparations, the cutting-attack key 36 is released, or lock-on is canceled, or the player character 5 receives damage, then the branch attack preparation state is canceled. On the other hand, if in a branch attack preparation completed state, upon releasing the cutting-attack key (button) 36, branch attack is initiated. That is, as shown in FIG. 5, the player character 5 and branch characters (1) through (4) simultaneously charge forward and attack the locked-on enemy character 6.

Or, as shown in the screen at the bottom of FIG. 10, only branch characters 5-1 through 5-3 which are the remaining afterimages, and not the player character 5, can simultaneously charge and attack the locked-on enemy character 6. In this case, the player character 5 does not itself receive any damage.

Figure 11:
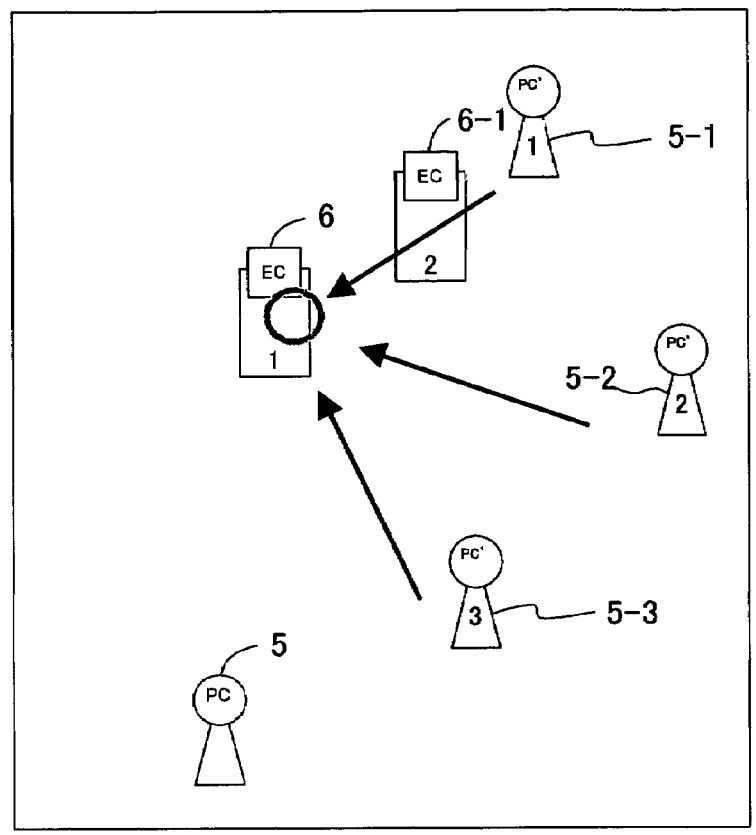
FIG. 11 explains an effect of branch attack of FIG. 7 and FIG. 8.
Figure 12:
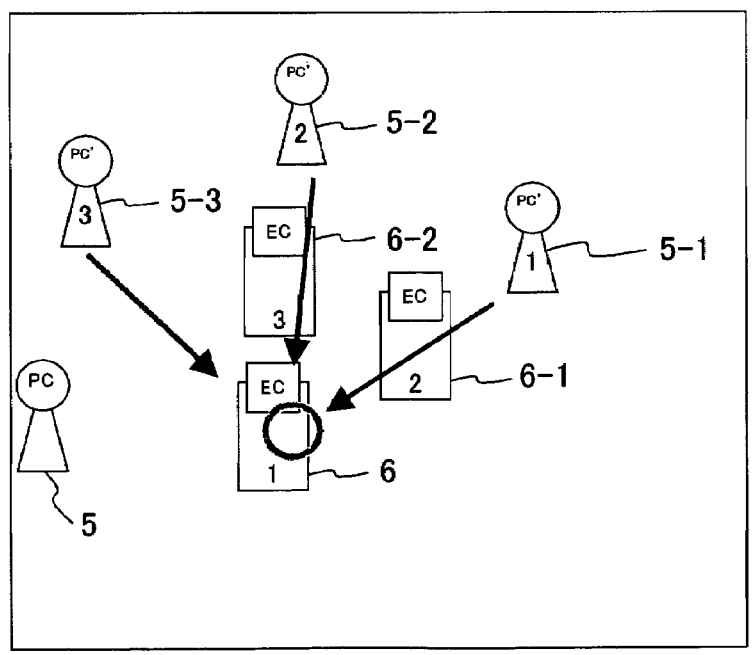
FIG. 12 explains another effect of branch attack of FIG. 7 and FIG. 8.

As shown in FIG. 11 and FIG. 12, when other enemy characters 6-1, 6-2 exist between the afterimages 5-1, 5-2 and the locked-on enemy character 6, these other enemy characters 6-1, 6-2 also receive damage.

FIG. 8 is a flow diagram of branch attack processing to realize branch attack of FIG. 7, FIG. 9 and FIG. 10.

(S10) The CPU 101 decides whether the cutting-attack key (button) 36 is being held down.

(S12) When the cutting-attack key 36 is being held down, a decision is made as to whether a fixed number of points have been accumulated in the chakra gauge. If the fixed number of points has not been accumulated, processing returns to step S10.

(S14) A decision is made as to whether an enemy is locked-on. If there is no lock-on, processing returns to step S10.

(S16) A decision is made as to whether there remains at least one afterimage resulting from a stealth dash. If no afterimage remains, processing returns to step S10. However, if an afterimage due to a stealth dash remains, branch attack preparations are judged to have been completed.

(S18) After completion of preparations, a decision is made as to whether the player character 5 has received damage. If damage has been received, the branch attack preparation state is canceled, and processing returns to step S10.

(S20) After completion of preparation, a decision is made as to whether the lock-on key 46-1 has been released and lock-on has been canceled. If lock-on has been canceled, the branch attack preparation state is canceled, and processing returns to step S10.

(S22) After the completion of preparations, a decision is made as to whether the cutting-attack key 36 has been released. If the attack state using the cutting-attack key 36 has been canceled, the branch attack preparation state is canceled, and processing returns to step S10. On the other hand, in the branch attack preparation completed state, if the cutting-attack key (button) 36 is released, a branch attack is initiated. That is, as shown in FIG. 5, the player character 5 and branch characters (1) through (4) simultaneously charge and attack the locked-on enemy character 6.

Or, as shown in the screen at the bottom of FIG. 10, only branch characters 5-1 through 5-3 which are remaining afterimages, and excluding the player character 5, can simultaneously charge and attack the locked-on enemy character 6. In this case the player character 5 receives no damage. The chakra gauge 22 is consumed in an amount equivalent to branch attack, and processing returns to step S10.

In this way, ninja branches can be utilized, and branches displayed as afterimages, imparting an attack capability to branches to increase the potential for attack, so that the action game is made more diverse, the player's interest in the game is increased, and the game is made more stimulating.

The stealth dash afterimages generated using the stealth dash key 38 are utilized for branches, so that the attacking branches can be positioned on the periphery of an enemy character 6 or at other desired positions, and a branch attack can be executed at optimal attack positions with respect to the enemy character 6. Consequently there is greater freedom in designing a branch attack depending on the skill of the player, attack strategies become more diverse, and the player's interest is increased.

Branch Attack Processing Method of the Second Embodiment

Figure 13:
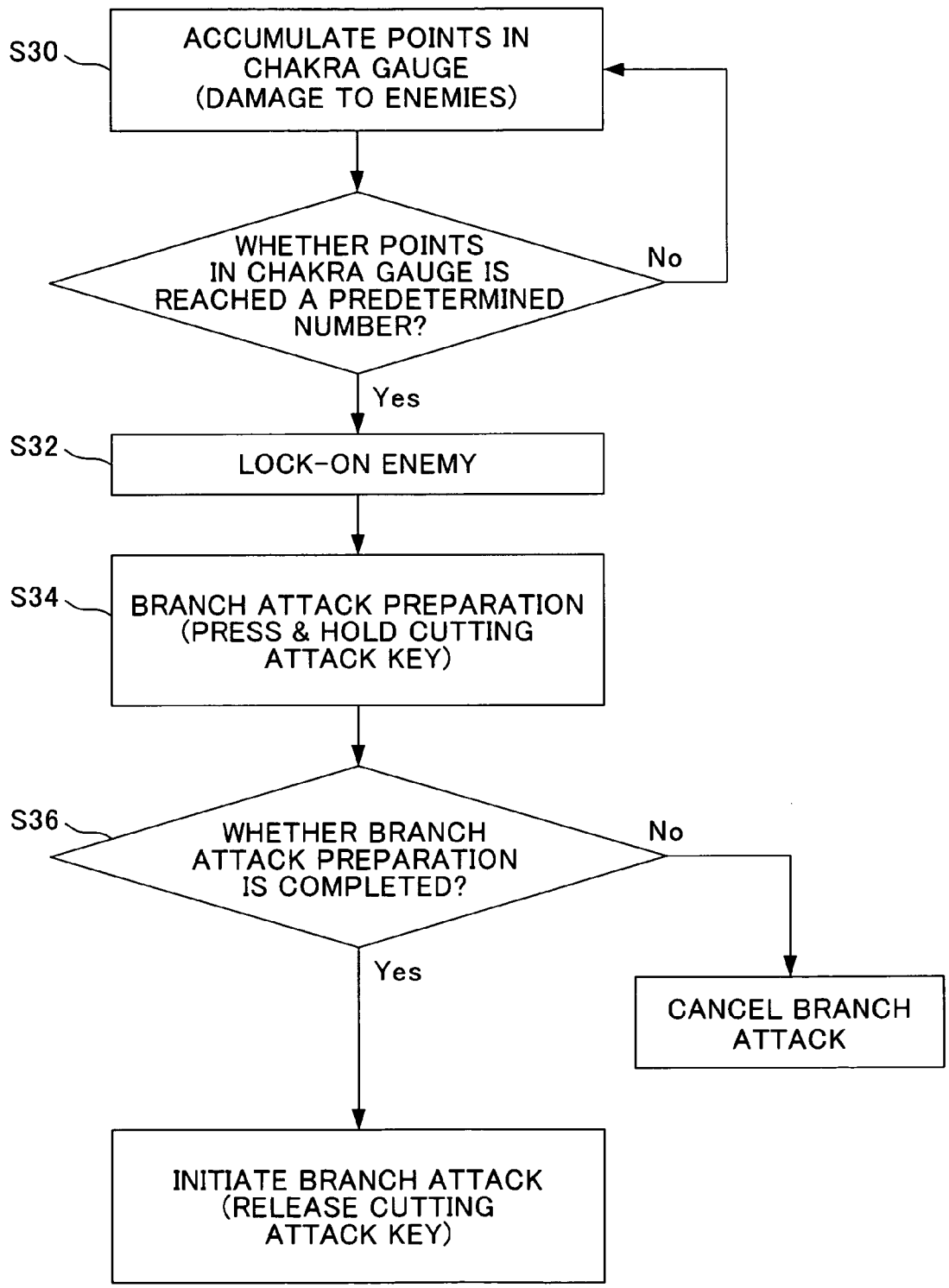
FIG. 13 explains the procedures of branch attack processing of another aspect of the invention.
Figure 14:
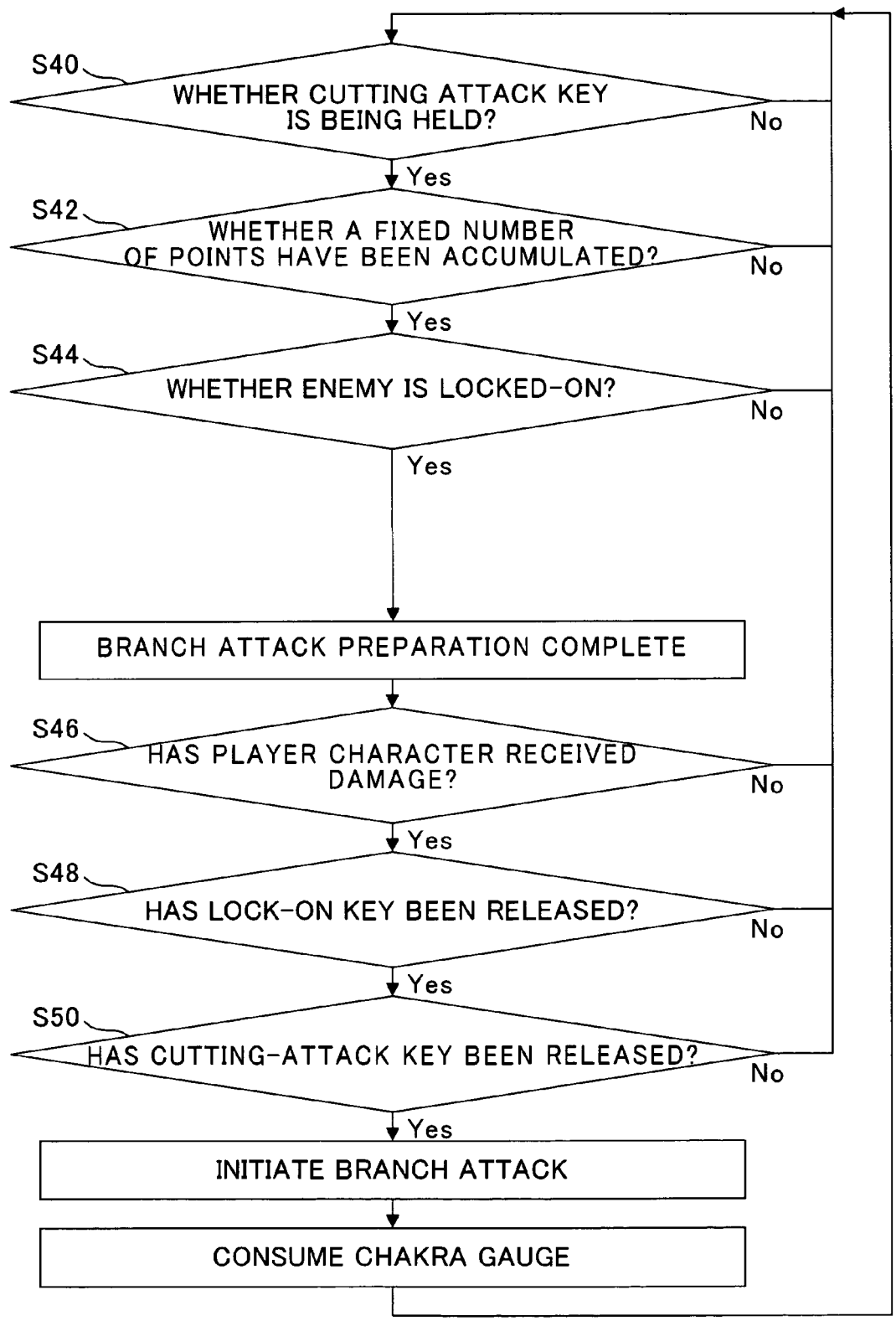
FIG. 14 is a flow diagram of processing for branch attack of FIG. 13.
Figure 15:
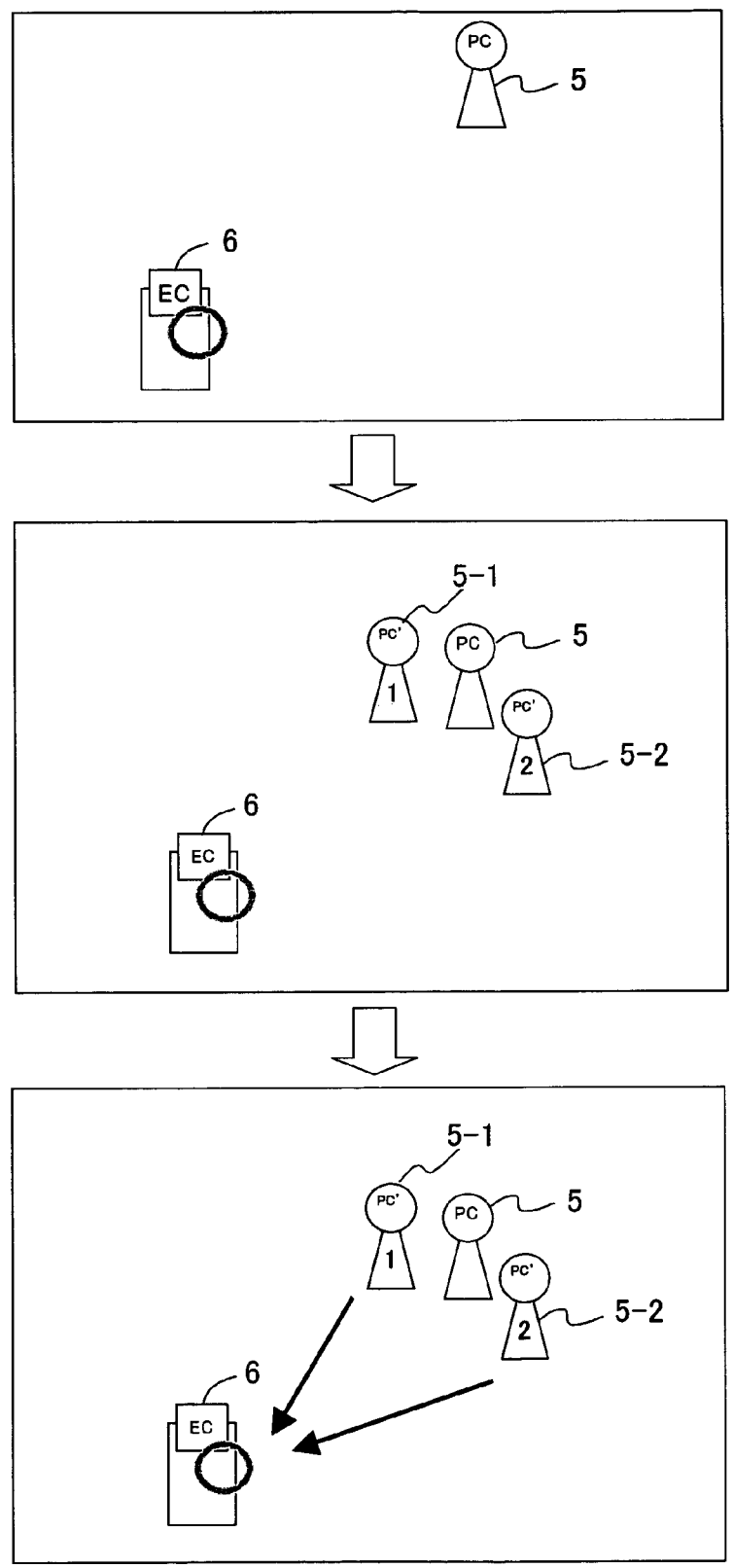
FIG. 15 explains branch attack of FIG. 13 and FIG. 14.
Figure 16:
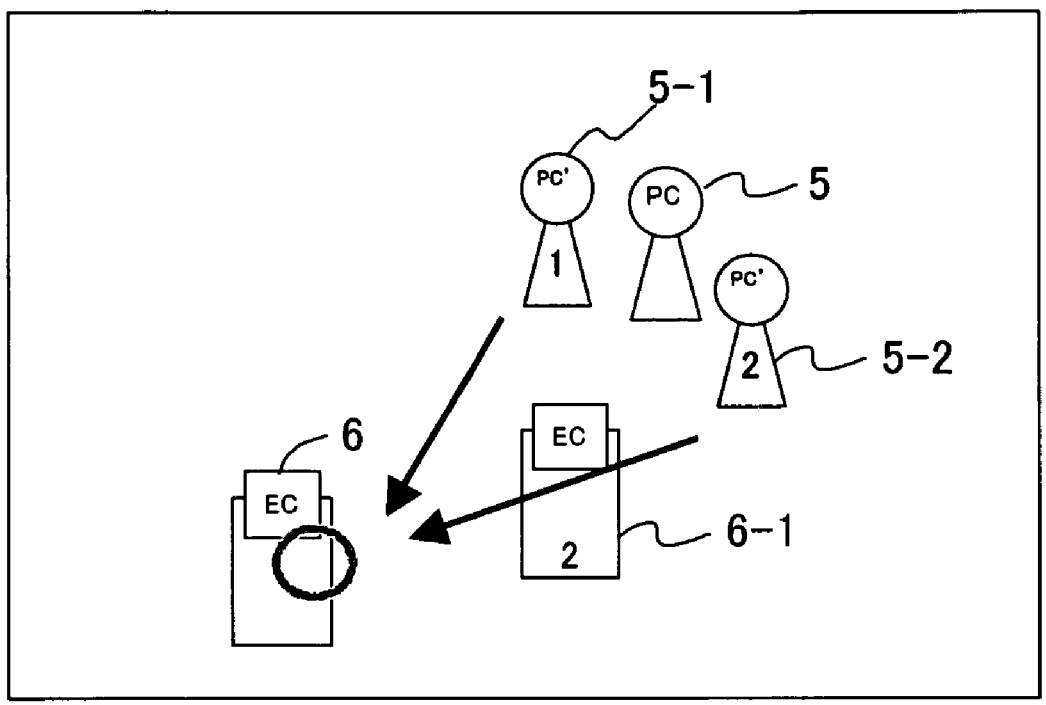
FIG. 16 explains an effect of branch attack of FIG. 13 and FIG. 14.

FIG. 13 is a flow diagram explaining branch attack procedures of a second embodiment of this invention, FIG. 14 is a flow diagram of processing of the procedures of FIG. 13, and FIG. 15 and FIG. 16 explain branch attacks in the second embodiment.

FIG. 13 is used to explain the procedures in a branch attack.

(S30) When an attack by the player character 5 imparts damage to an enemy, points are accumulated in the chakra gauge 22.

(S32) If a fixed number of points have accumulated in the chakra gauge, a branch attack is possible. In order to execute a branch attack, locking onto the enemy to be attacked is performed. That is, as shown in the upper screen in FIG. 15, the player character 5 is made to face the enemy character 6 to be attacked, and the lock-on key 46-1 is pressed. As a result a lock-on marker 7 is displayed on the periphery of the enemy character 6 for attack, as shown in FIG. 4.

(S34) Next, the cutting-attack key (button) 36 is pressed and held, to enter branch attack preparations. At this screen, as shown in the middle screen in FIG. 15, branch afterimages 5-1, 5-2 are displayed on either side of the player character 5.

(S36) Then, a decision is made as to whether branch attack preparations are completed. Prior to completion of preparations, if the cutting-attack key 36 is released, or the lock-on state is canceled, or if the player character 5 receives damage, then the branch attack preparation state is canceled. On the other hand, if in the branch attack preparation completed state the cutting-attack key (button) 36 is released, a branch attack is initiated. That is, as shown in the bottom screen in FIG. 15, only branch characters 5-1 and 5-2 which are afterimages, but not the player character 5, simultaneously charge and attack the locked-on enemy character 6. In this case, the player character 5 does not receive any damage.

As shown in FIG. 16, when another enemy character 6-1 exists between the afterimages 5-1, 5-2 and the locked-on enemy character 6, the other enemy character 6-1 also receives damage.

FIG. 14 is a flow diagram of branch attack processing to realize branch attack of FIG. 13 and FIG. 15.

(S40) The CPU 101 decides whether the cutting-attack key (button) 36 is being pressed continuously.

(S42) If the cutting-attack key 36 is being pressed continuously, a decision is made as to whether a fixed number of points have accumulated in the chakra gauge 22. If the fixed number of points have not accumulated, processing returns to step S40.

(S44) A decision is made as to whether an enemy character has been locked-on. If there has been no lock-on, processing returns to step S40. If an enemy has been locked-on, because an afterimage remains, it is decided that branch attack preparations have been completed.

(S46) After completion of preparations, a decision is made as to whether the player character 5 has received damage. If damage has been received, the branch attack preparation state is canceled, and processing returns to step S40.

(S48) After the completion of preparations, a decision is made as to whether the lock-on key 46-1 has been released and the lock-on state canceled. If the lock-on state has been canceled, the branch attack preparation state is canceled, and processing returns to step S40.

(S50) After the completion of preparations, a decision is made as to whether the cutting-attack key 36 has been released. If the attack state has been canceled using the cutting-attack key 36, the branch attack preparation state is canceled, and processing returns to step S40. On the other hand, if in the branch attack preparation completed state the cutting-attack key (button) 36 is released, a branch attack is initiated. That is, as shown in the lower screen in FIG. 15, only branch characters 5-1 through 5-3 which are remaining afterimages, but not the player character 5, simultaneously charge and attack the locked-on enemy character 6. In this case, the player character 5 does not itself receive any damage. The chakra gauge 22 is consumed in an amount equivalent to the branch attack, and processing returns to step S40.

In this way, ninja branches ('bunshin') can be utilized, and branches displayed as afterimages, imparting an attack capability to branches to increase the potential for attack, so that the action of the action game is made more diverse, the player's interest in the game is increased, and the game is made more stimulating.

Also, a branch attack can be executed through operation of just the cutting-attack button 36 and lock-on key 46-1, so that operation is simple, and a branch attack can be executed using rapid operation. Hence the speed of the game is not hindered by the skill of the player, and the player's interest can be increased.

Other Embodiments

A ninja action game using swords was described as the action game; but this invention can also be applied to shooting games, fight-action games, and other so-called action games in which a mobile object of the player's is moved in realtime through a game space while attacking other mobile objects, based on operations of the player. That is, in essence the invention can be applied to any game in which a player character confronts a plurality of target characters.

Also, the accumulation of points in the chakra gauge provides a player with the option of executing branch attacks; but the branch attack option may also be provided when a prescribed item has been acquired, or similar.

Further, an example was explained in which a cutting-attack button is used as the attack key; but application to other attack keys is possible, and for example a dedicated button may be pressed to call up a special attack menu, from which a branch attack can be selected.

Similarly, examples were explained in which by pressing an attack key for a long period of time branch characters are generated at prescribed positions on the periphery of the player character, or by performing a dash movement an afterimage branch is left at the position preceding the movement. However, instead of this branch characters may be generated at the current position of the player character or at positions in the game space specified arbitrarily by the player through such operations as pressing and holding an attack key for a fixed length of time or longer, and then releasing, or by pressing a branch generation button, or similar. For example, when a lock-on function is provided, a prescribed number of branches (for example, a number corresponding to the number of points accumulated in the chakra gauge) can be generated at prescribed locations on the periphery with reference to the position coordinates in the game space of a locked-on enemy character. That is, branch characters can be generated centered on the position of an enemy character, regardless of the position of the player character.

Further, when a branch is partly embedded in the terrain (interferes with a background object), the branch can be generated at a position which avoids such interference. In this case, it is desirable that the position of appearance be shifted in the direction approaching the character serving as reference (the player character or enemy character).

In the above, aspects of the invention have been explained, but various modifications are possible within the scope of this invention, and such modifications are not excluded from the scope of the invention.

As explained above, an action game can be provided with branch attack action, so that the action game can be made more diverse, contributing to the widespread adoption and use of the game, and serving to enhance the strategic properties of the game and the fight attributes of the game.

What is claimed is:

1. A game processing method, for an action game in which a player character defeats an enemy character in a virtual space displayed by a display device through operation of a controller by a player, said method comprising the steps:

executing an attack target decision process of deciding the enemy character according to a lock-on operation of the enemy character through said controller as an attack target;

executing a branch attack preparation process, said branch attack preparation process comprising: moving said player character in said virtual space, generating a branch character that imitates a form of said player character and is not a function for judging hits by said enemy character on said moving start position of said player character in said virtual space, and displaying said player character, said enemy character and said branch character according to branch generation operations by said player using said controller;

executing a branch attack processing comprising attacking said enemy character decided said attack target by, at least, said branch character to cause a damage to said enemy character during the displaying of said branch character, according to the branch attack operation by said player using said controller; and executing a branch disappear process comprising disappearing said branch character after attacking said enemy character by said branch character.

2. A game apparatus, for a game in which a player character defeats an enemy character in a virtual space displayed by a display device through operation by a player, said apparatus comprising:

a controller, operated by said player, to perform, at least, moving operation of said player character, attack operation to said enemy character, branch generation and branch attack operations; and a processing unit for executing an attack target decision process of deciding the enemy character according to a lock-on operation of the enemy character through said controller, as an attack target, executing a branch attack preparation process of moving said player character in said virtual space, generating a branch character that imitates a form of said player character and is not a function for judging hits by said enemy character on said moving start position of said player character in said virtual space, and displaying said player character, said enemy character and said branch character according to branch generation operations by said player using said controller, and executing a branch attack processing of attacking said enemy character decided said attack target by, at least, said branch character to cause a damage to said enemy character during displaying said branch character, according to branch attack operation by said player using said controller, wherein said processing unit executes a branch disappear process of disappearing said branch character after attacking said enemy character by said branch character.

3. A computer-readable medium encoded with a game program to perform an action game in which a player character defeats an enemy character in a virtual space displayed by a display device through operation of a controller by the player, said game program causing a processor to perform the steps of:

executing an attack target decision process of deciding the enemy character according to a lock-on operation of the enemy character through said controller, as an attack target;

executing a branch attack preparation process of moving said player character in said virtual space, generating a branch character that imitates a form of said player character and is not a function for judging hits by said enemy character on said moving start position of said player character in said virtual space, and displaying said player character and said branch character, said enemy character and said branch character according to branch generation operations by said player using said controller;

executing a branch attack processing of attacking said enemy character decided said attack target by, at least, said branch character to cause a damage to said enemy character during displaying said branch character according to branch attack operation by said player using said controller; and executing a branch disappear process of disappearing said branch character after attacking said enemy character by said branch character.

4. The computer-readable medium according to claim 3, wherein said branch attack preparation step comprises a step of displaying said player character and said branch character according to the depressing for a fixed length of time of an attack button of said controller.

5. The computer-readable medium according to claim 4, further comprising a step of for canceling said branch attack preparation state when the depression for a fixed length of time of said attack button is not detected.

6. The computer-readable medium according to claim 3, further comprising a step of canceling said branch attack preparation state and disappearing said branch character in response to cancellation of said lock-on operation of said controller during said attack target decision process and said branch attack preparation process.

7. The computer-readable medium according to claim 3, wherein said branch attack preparation step comprises a step of generating said branch character at a position of said moving locus of said player character according to movement operation of said player character in said virtual space by said player, according to branch generation operation using said controller, and of displaying said player character and said branch character.

8. The computer-readable medium according to claim 3, wherein said branch attack preparation step comprises a step of generating plural said branch characters at positions on the periphery of said player character in said virtual space according to branch generation operation using said controller, and of displaying said player character and said plural branch characters.

9. The computer-readable medium according to claim 3, further comprising a step of canceling said branch attack preparation state and disappearing said branch character when, during said attack target preparation process and said branch attack preparation process, detecting that said player character receives damage from said enemy character.

10. The computer-readable medium according to claim 3, further comprising:

a step of accumulating points corresponding to damage imparted to said enemy through operations by said player; and a step of permitting said branch attack when the number of said points accumulated is equal to or greater than a fixed number, and wherein said branch attack preparation step comprises a step of generating a plurality of said branch characters, in a number corresponding to the number of said accumulated points, in relation to the position of said player character in said virtual space, according to branch generation operation using said controller, and of displaying said player character and said plurality of branch characters.

11. The computer-readable medium according to claim 3, further comprising:

a step of judging whether or not a parameter for using a branch attack option of said player character is over a predetermined amount in accordance with said lock-on operation; and a step of permitting said branch attack preparation process when judging that said parameter is over said predetermined amount.

12. A computer-readable medium encoded with a game program to cause a processor as a game device for playing an action game in which displays a screen that a player character and an enemy character attack each other in a virtual space through operation of a controller by a player, said game program causes a processor to perform the steps:

executing an attack target decision process of deciding the enemy character according to lock-on operation of the enemy character through said controller as an attack target;

executing a branch attack preparation process of generating a branch character that imitates a form of said player character and is not a function for judging hits by said enemy character, on a position on the peripheral of said player character in said virtual space, and of displaying said player character, said enemy character and said branch character, according to branch generation operations by said player using said controller;

executing a branch attack processing of attacking said enemy character decided said attack target by, at least, said branch character to cause a damage to said enemy character during displaying said branch character, according to branch attack operation by said player using said controller; and executing a branch disappear process of disappearing said branch character after attacking said enemy character by said branch character.

13. A game processing method for playing an action game in which displays a screen that a player character and an enemy character attack each other in a virtual space through operation of a controller by a player, comprising the steps:

executing an attack target decision process of deciding the enemy character according to a lock-on operation of the enemy character through said controller as an attack target;

executing a branch attack preparation process of generating a branch character that imitates a form of said player character and is not a function for judging hits by said enemy character, on a position on the peripheral of said player character in said virtual space, and of displaying said player character, said enemy character and said branch character, according to branch generation operations by said player using said controller;

executing a branch attack processing of attacking said enemy character decided said attack target by, at least, said branch character to cause a damage to said enemy character during displaying said branch character, according to branch attack operation by said player using said controller; and executing a branch disappear process of disappearing said branch character after attacking said enemy character by said branch character.

14. A game apparatus for playing an action game in which displays a screen that a player character and an enemy character attack each other in a virtual space through operation by a player, comprising:

a controller, operated by said player, to perform, at least, moving operation of said player character, attack operation to said enemy character, branch generation and branch attack operations; and a processing unit for executing an attack target decision process of deciding the enemy character according to a lock-on operation of the enemy character through said controller, as an attack target, executing a branch attack preparation process of generating a branch character that imitates a form of said player character and is not a function for judging hits by said enemy character, on a position on the peripheral of said player character in said virtual space, and of displaying said player character, said enemy character and said branch character, according to branch generation operations by said player using said controller, and executing a branch attack processing of attacking said enemy character decided said attack target by, at least, said branch character to cause a damage to said enemy character during displaying said branch character, according to branch attack operation by said player using said controller, wherein said processing unit executes a branch disappear process of disappearing said branch character after attacking said enemy character by said branch character.

\* \* \* \* \*